UNITED STATES PATENT OFFICE.

JAY H. HALL, OF CLEVELAND, OHIO, ASSIGNOR TO THE ELECTRIC CONTROLLER AND MANUFACTURING COMPANY, OF CLEVELAND, OHIO, A CORPORATION OF OHIO.

ELECTRIC CONTROLLER.

1,053,497.  Specification of Letters Patent.  Patented Feb. 18, 1913.

Application filed October 30, 1911. Serial No. 657,493.

*To all whom it may concern:*

Be it known that I, JAY H. HALL, a citizen of the United States, residing at Cleveland, in the county of Cuyahoga and State of Ohio, have invented new and useful Improvements in Electric Controllers, of which the following is a specification.

My invention relates to improvements in electric controllers and particularly that type which are known as series-parallel controllers.

Some of the objects of my invention are to provide, in a series parallel controller, each motor with a rheostatic resistance, only one set of switches for cutting out sections of resistance simultaneously in each rheostat, said switches having an operating winding energized by one motor circuit and a holding winding to maintain it closed, and to provide the series and parallel switches with a locking circuit which is energized upon the closure of the first resistance switch and is held energized so long as the motors are in circuit.

Referring to the accompanying drawings, the figures show diagrammatically two of the many forms which my invention may assume.

Figure 1:
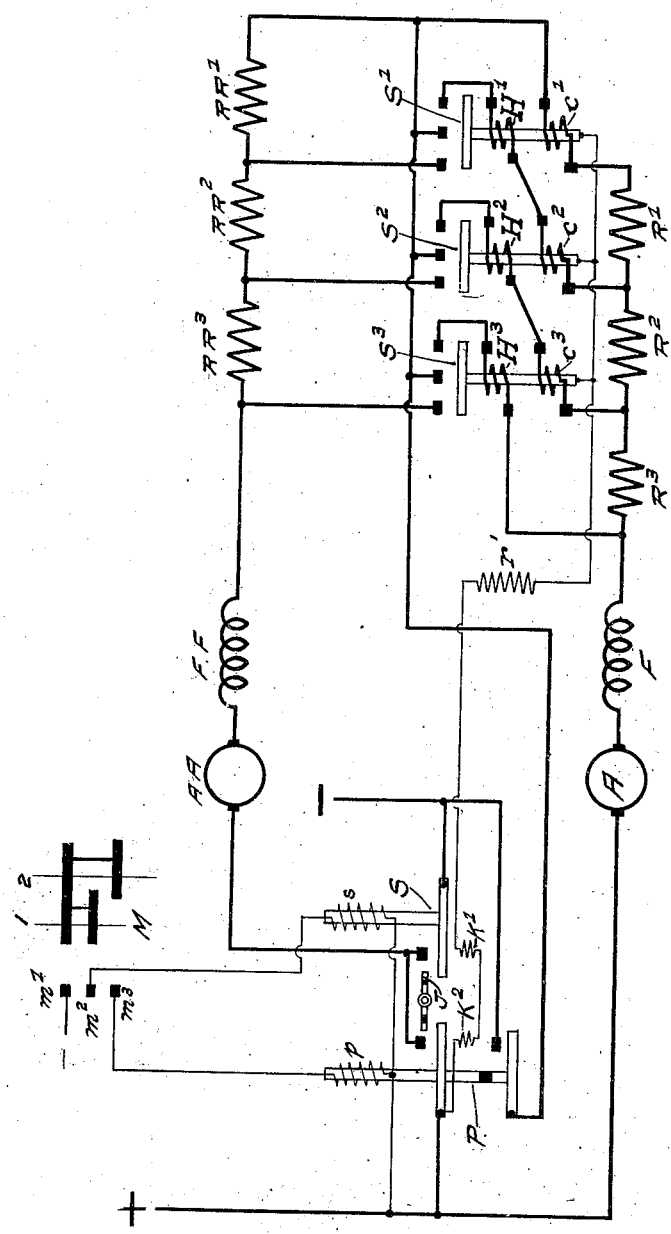

Referring to Figure 1, which shows my invention applied to the series parallel control of two motors, M indicates a master controller, S a series connection switch, and P a parallel connection switch. The actuating coils $s$ and $p$ of these switches have one end permanently connected to the positive, the other end being connected to the negative by the operation of the master controller. The armature of one motor is shown at A, the series field thereof at F and the regulating resistance at $R^3$, $R^2$, $R'$. The armature of the other motor is shown at AA, the series field thereof at FF, and the regulating resistance at $RR^3$, $RR^2$, $RR'$. Both sets of resistances are controlled by a series of resistance switches S', $S^2$, $S^3$.

The resistance switches are of the type described in Harry R. Canfield's applications, Serial Number 583,000, filed September 21, 1910, and Serial Number 604,331, filed January 24, 1911, and Eastwood's Patent No. 1,040,292, granted October 8, 1912, in which applications and patent the switches have the peculiar characteristic that they remain in open position when their operating windings are energized above a predetermined value, and will operate to close their contacts when the energization falls below this value. Each switch is provided with an operating winding $c'$, $c^2$, $c^3$, respectively, and a maintaining winding $H'$, $H^2$, $H^3$, respectively, both of which are energized by the current in the motor circuit.

A mechanical interlock between the switches S and P is shown at J. There is also an electrical interlock consisting of two locking-out coils $K^2$, $K'$ in series with a resistance $r'$ in a circuit, one end of which is connected to the positive and the other end to the bridging pieces of the switches S', $S^2$, $S^3$. When energized, the coils K', $K^2$ lock their respective switches in the open position but are not strong enough to force them open after having been closed by manipulation of the master controller.

The operation of the controller is as follows: Bringing the master controller M to position 1 establishes a circuit from the positive through the actuating coils of the series switch S, and the brushes $m^2$, $m'$ to the negative, whereupon the switch S closes, completing the motor circuit from the positive through the armature A and the series field F of the first motor, the resistance sections $R^3$, $R^2$, $R'$, the operating winding $c'$ of the switch S', the resistance sections RR', $RR^2$, $RR^3$, the series field FF and the armature AA of the second motor, and the series switch S to the negative. The two motors are connected in series, the current in the motor circuit being limited by the total resistance in the two rheostats. The heavy starting current flowing into the winding $c'$ of the switch S' locks it in the open position, but, as the motors accelerate, the current decreases until it falls to the value at which the switch S' is adjusted to operate, whereupon the switch S' closes its contacts, short-circuits simultaneously the sections R', RR' of the resistance together with the operating winding $c'$ of the switch S' and connects the operating winding $c^2$ of the switch $S^2$ and also the maintaining winding H' of the switch S' in the motor circuit. The current follows now a path, starting from a point between the resistance sections $R^2$ and R', through the winding $c^2$, the winding H', and the contacts on the switch S' to a point between the resistance sections $RR^2$, RR'. It will be seen that the resistances R' and RR' and also the winding $c'$ are short-circuited. However, since the winding H' is now energized, the switch S' will be held closed.

The short-circuiting of the first section of the starting resistance causes a rush of current in the motor circuit through the winding $c^2$, which locks open the switch $S^2$ until the speeding up of the motor diminishes the amount of current to the value at which the switch $S^2$ is adjusted to operate. Then the switch $S^2$ will close its contacts, short-circuit simultaneously the sections of the resistance $R^2$, $RR^2$, also the switch windings $c^2$ and H', and will connect the operating winding $c^3$ of the switch $S^3$ and the holding winding $H^2$ of the switch $S^2$ in the motor circuit. The windings $c^2$ and H' are now deënergized; consequently the switch S' drops to the open position, but the switch $S^2$ is held in the closed position by the energization of the winding $H^2$. Similarly, the switch $S^3$ is locked open until the current in the motor circuit decreases to the value at which it is adjusted to operate, whereupon it will close its contacts, short-circuit simultaneously the two sections of resistance $R^3$—$RR^3$ and the windings $c^3$ and $H^2$. The deënergization of the winding $H^2$ causes the switch $S^2$ to drop to the open position. The switch $S^3$ is held closed by the energization of the winding $H^3$. The two motors are now connected in series directly across the line, current flowing from the positive through the armature A and the field F of the first motor, the winding $H^3$ and the contacts of the switch $S^3$, the field FF and the armature AA of the second motor, and the series switch S to the negative. The resistance switch S' has another function: that of completing the locking-out circuit for the series switch S and the parallel switch P. As soon as the switch S' closes its contacts, the locking-out circuit is completed, current flowing from the positive through the locking-out coils $K^2$ and K', the resistance r', the bridging piece of the switch S', the contacts thereof, the resistances RR', $RR^2$, $RR^3$, the field FF, the armature AA, and the switch S to the negative. It follows that, when the motors are coupled in series, the locking-out circuit is in parallel with the motor A and in series with the other motor AA. The energization of the coil $K^2$ locks the parallel switch P in the open position, but is powerless to open the said switch, once it is closed. Similarly, the coil K' though energized is not strong enough to force open the series switch S, which is held closed by the coil s, but will prevent the closure of the said switch after it drops to the open position. It will be seen also that the switch $S^2$ in operating closes at the same time a branch for the locking-out circuit through which current flows when the switch S' drops. Likewise, the switch $S^3$ in operating closes a branch for the locking-out circuit through which current flows when the switch $S^2$ drops.

To increase the speed of the motors, the master controller is brought to the parallel position, the brushes m', $m^2$, $m^3$ being on the line 2. It will be seen that for a short time both coils s and p are energized, the said coils being in parallel circuits completed through the brushes $m^3$ and $m^2$. However, the switch P can not close owing to the mechanical interlock J and to the locking coil $K^2$ which is energized; but as soon as the brush $m^2$ leaves its corresponding strip, the coil s is deënergized and the series switch S drops to the open position which in turn opens the motor circuit and causes the switch $S^3$ to drop since its holding winding $H^3$ is now deënergized. The switch $S^3$ in dropping opens the locking-out circuit, thus deënergizing the coils $K^2$ and K'. The switch P will now close quickly connecting the two motors in parallel, one branch of the circuit being completed from the positive through the armature A and the field F of the first motor, the resistances $R^3$, $R^2$, R', the operating coil c' of the resistance switch S', and the lower contact of the switch P to the negative; the other branch being established from the positive through the upper contact of the switch P, the armature AA and the field FF of the second motor, the resistances $RR^3$, $RR^2$, RR', and the lower contact of the switch P to the negative. In closing, the parallel switch P tilts the mechanical interlock J so as to prevent the closure of the series switch S. When the current in the circuit of the motor A has decreased below a certain limit, the switch S' closes again, short-circuits the resistance R' in the circuit of the motor A, and the resistance RR' in the circuit of the motor AA, and connects the operating winding $c^2$ of the switch $S^2$ and its own holding coil H' in the circuit of the motor A. Therfore, the switch S' is held closed by the energization of the winding H'. The locking out circuit is also energized, current flowing from the positive through the locking-out coils $K^2$ and K', the resistance r', the bridging piece of the switch S', and the contacts thereof to the negative through the lower contact of the switch P. The coil $K^2$ is powerless to force the switch P open, whereas the coil K' locks the switch S to the open position. The resistance switch $S^2$, at first locked open by the rush of current, will close its contacts as soon as the current in the motor circuit falls to the value at which it is adjusted to operate. In operating, the switch $S^2$ will short-circuit the resistance $R^2$ in the circuit of the motor A, the resistance $RR^2$ in the circuit of the motor AA, and its operating coil $c^2$ and the holding coil H' of the switch S', at the same time connecting the operating coil $c^3$ of the switch $S^3$ and its own holding coil $H^2$ in circuit. The switch S' will drop, but the locking-out circuit is maintained through the bridging piece of the switch $S^2$. Finally, the current falls to a value which allows the switch $S^3$ to operate, whereupon the said switch in closing its contacts short-circuits the resistance $R^3$ in the circuit of the motor A and the resistance $RR^3$ in the circuit of the motor AA; and also short-circuits the windings $c^3$ and $H^2$ and connects its own holding coil $H^3$ in circuit, which holds the switch $S^3$ closed. The switch $S^2$ drops to open position. The two motors are now connected directly across the line, all resistance being short-circuited. The motor A is connected to the negative through the winding $H^5$, the contacts of the switch $S^3$, and the lower contact of the switch P, and the motor AA is connected to the negative through the contacts of the switch $S^3$ and the lower contact of the switch P. The locking-out circuit is connected to the negative through the bridging piece of the switch $S^3$.

One point to be noticed is that in the series position the locking-out circuit receives only half the voltage of the supply since it is connected in series with the motor AA, whereas in the parallel position said circuit receives full voltage since it is connected directly across the mains through the operation of the resistance switches. Therefore, the windings of the coils $K^2$ and K' must be so proportioned as to be effective with only half the voltage of the supply. Another point to be noticed is that the operating windings of the resistance switches are connected in one motor circuit only when the motors are connected in parallel which insures the same value of current for operating the switches for series or parallel connection of the motors.

Figure 2:
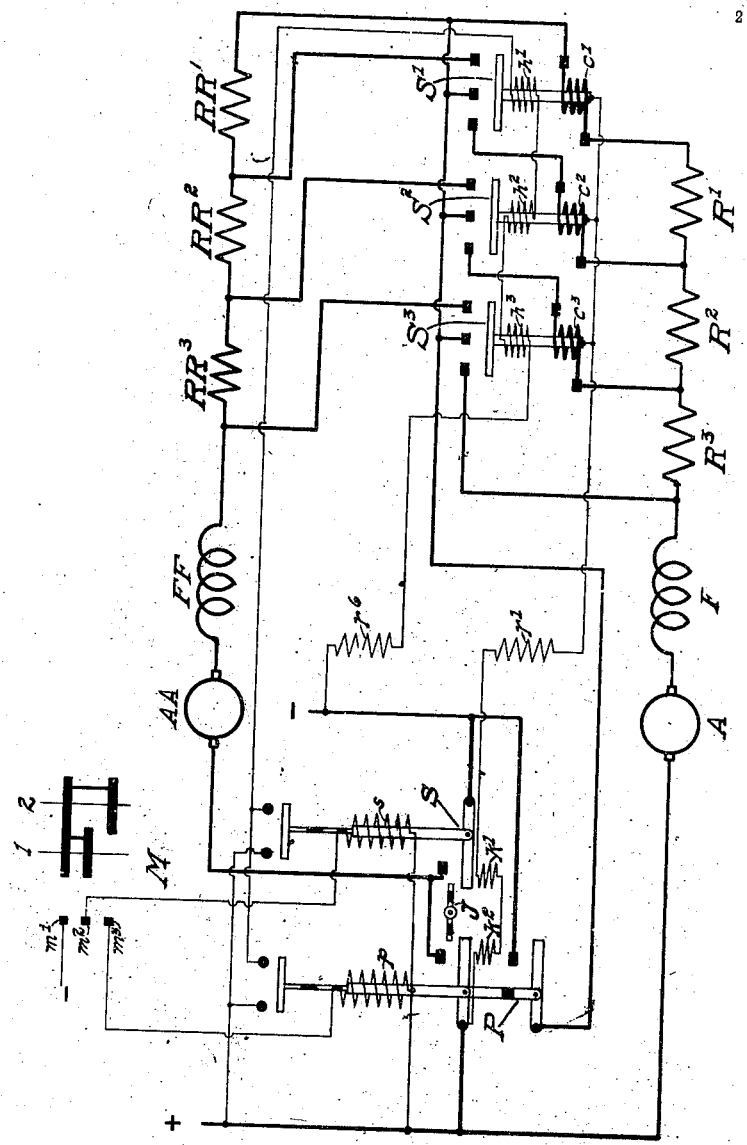

In the controller shown in Fig. 2 the series switch S and the parallel switch P are each provided with auxiliary contacts which are closed when said switches operate. The resistance controlling switches S', $S^2$, $S^3$, are of the type described in Harry R. Canfield's application, Serial Number 583,000, which have their operating windings in the motor circuit and are locked in the open position as long as the current is above a predetermined limit. The operating windings of the switches S', $S^2$, $S^3$ are shown at c', $c^2$, $c^3$, respectively. Each of these switches is also provided with a holding coil h', $h^2$, $h^3$, respectively, which, instead of being connected in turn in the motor circuit as in Fig. 1, are connected in series in a shunt circuit which is easily traced from the positive through the auxiliary contacts of either the switch S or the switch P, the windings h', $h^2$, $h^3$, and the resistance $r^6$ to the negative. The windings h', $h^2$, $h^3$ are so proportioned that when energized they are unable to operate their respective switches but are strong enough to hold them closed once they have operated.

In operation, when the master controller is brought to the series position. the series switch S closes immediately and bridges its auxiliary contacts. The holding circuit of the resistance switches is now completed and the current therein flows in the windings h', $h^2$, $h^3$, but the switches S', $S^2$, $S^3$ cannot close, as above explained. The closing of the switch S completes also the motor circuit, current flowing from the positive through the armature A and the field F of the first motor, the resistances $R^3$, $R^2$, R', the operating winding c' of the switch S', the resistances RR', $RR^2$, $RR^3$, the field FF and the armature AA of the second motor, and the switch S to the negative. The two motors are then connected in series with all the starting resistance in circuit. When the current in the winding c' diminishes to a certain predetermined limit, the switch S' will close its contacts, short-circuit simultaneously the two sections R' and RR' of the resistance and connect the operating winding $c^2$ of the switch $S^2$ in circuit. At the same time the winding c' is short-circuited, but the switch S' is held closed by the energization of the winding h'. The operation of the switch S' establishes also the locking-out circuit, current flowing from the positive through the coils $K^2$, K', the resistance r', the bridging piece of the switch S', the resistances RR', $RR^2$, $RR^3$, the motor AA, and the switch S to the negative. It follows that the switch P will be locked in the open position by the coil $K^2$. The switches $S^2$ and $S^3$ will operate successively in the same manner as the switch S', short-circuiting a section of the resistance simultaneously in each rheostat until the switch $S^3$ operates, whereupon the two motors are connected in series directly across the line with all the starting resistance short-circuited. It must be noticed that after a resistance switch has operated it is held closed and does not drop when the next switch operates. If now the master controller is brought to the parallel position, the windings of the two switches S and P are energized together for a short time; but the switch P cannot close since it is locked by the coil $K^2$ and the interlock J. As soon as the brush $m^2$ leaves its strip, the switch S drops open, whereupon the motor circuit and the holding circuit open. The resistance-controlling switches also drop to the open position since the holding coils h', $h^2$, $h^3$ are deënergized. The switch that drops last also opens the locking-out circuit. This allows the parallel switch P to close and to bridge its auxiliary contacts, thus energizing again the holding circuit through the coils $h'$, $h^2$, $h^3$. The two motors are now connected in parallel, the circuit of one motor being established from the positive through the armature A, the field F, the resistance $R^3$, $R^2$, $R'$, and the operating coil $c'$, to the negative through the lower contact of the switch P, and the circuit of the other motor being completed from the positive through the upper contact of the switch P, the armature AA, the field FF, and the resistances $RR^3$, $RR^2$, $RR'$ to the negative through the lower contact of the switch P. The resistance switches will then operate as has been previously described, each switch short-circuiting a section of resistance simultaneously in the two rheostats and connecting the operating coil of the succeeding switch in the motor circuit. When the switch $S^3$ operates, all the resistance is short-circuited and the two motors are connected in parallel, directly across the line, which is the position of maximum speed. As soon as the switch $S'$ operates, the locking-out circuit is again energized, thus locking the switch S in the open position and preventing the operation thereof so long as the switch P is closed. As in the case of Fig. 1, when the motors are connected in series, the locking circuit receives only half the voltage of the supply, whereas, when the motors are connected in parallel, the locking circuit receives full voltage. As in Fig. 1, the operating windings of the resistance switches are connected in the circuit of only one motor when the motors are connected in parallel.

It will be readily understood by those skilled in the art that reversing switches for the motors of the type used in the series parallel method of control can be used in connection with my invention. If the reversing switches are magnetically operated, another set of coils like $K^2$ and $K'$ can be provided in the locking circuit.

I claim—

1. In a series-parallel control system, two motors, a resistance in series with each motor, switches for controlling the resistances, operating windings for the switches energized by current through one of the motors, and means for connecting the motors in series and in parallel.

2. In an electric controller, two resistances, one or more switches for controlling the resistances, operating windings for the switches, energized by current through one of the resistances, and means connecting the resistances in series and in parallel.

3. A circuit, two resistances therein, means for connecting them in series and in parallel, contacts for controlling the resistances, and operating windings in the said circuit for closing the said contacts.

4. A circuit, two resistances therein, means for connecting them in series and in parallel, contacts for controlling the resistances, operating windings in the said circuit for closing the said contacts, and holding windings for holding the contacts closed.

5. A circuit, two resistances therein, means for connecting them in series and in parallel, contacts for controlling the resistances, and operating windings in the said circuit for closing the contacts, the contacts having means for holding them closed so long as current flows through the said contacts.

6. In a circuit, two resistances, means for connecting them is series and in parallel, contacts for controlling the resistances, and means including operating windings for locking the contacts open when the current in the windings is above a predetermined value and closing the contacts when the current is reduced.

7. A circuit, two resistances therein, means for connecting them in series and in parallel, contacts for controlling the resistances, operating windings in the said circuit for closing the contacts, and holding windings energized upon closure of the contacts, for holding the contacts closed.

8. In a series-parallel control system, two motors, switches for connecting them in series and in parallel, resistances for the motors, contacts for controlling the resistances, operating windings for the contacts energized by the current through one of the motors, and holding windings effective so long as current flows through the contacts.

9. In a series-parallel control system, two motors, switches for connecting them in series and in parallel, resistances for the motors, contacts for controlling the resistances, and operating windings for the contacts energized by the current through one of the motors to lock the contacts open when the current in the winding is above a predetermined value and to close the contacts when the current is reduced.

10. In a series-parallel control system, two motors, switches for connecting them in series and in parallel, resistances for the motors, contacts for controlling the resistances, and means energized when the said contacts are closed, for holding one of the switches open.

11. In a series-parallel control system, two motors, switches for connecting them in series and in parallel, resistances for the motors, contacts for controlling the resistances, and a locking circuit energized when said contacts are closed, for preventing the closure of one of the switches.

12. In a series-parallel control system, two motors, switches for connecting them in series and in parallel, resistances for the motors, contacts for controlling the resistances, a locking circuit energized when said contacts are closed, and magnets in the locking circuit for preventing the closure of one of the switches.

13. In a series-parallel control system, two motors, switches for connecting them in series and in parallel, resistances for the motors, contacts for controlling the resistances, a bridging piece for said contacts, and a locking circuit connected to the bridging piece for preventing the operation of one of the switches.

14. In a series-parallel control system, two motors, switches for connecting them in series and in parallel, resistances for the motors, contacts for controlling the resistances, a bridging piece for the contacts, and means connected to the bridging piece for holding one of the switches open.

15. In a series-parallel control system, two motors, switches for connecting them in series and in parallel, resistances for the motors, contacts for controlling the resistances, and means for closing the contacts energized by current through one of the motors.

16. In a series-parallel control system, two motors, switches for connecting them in series and in parallel, resistances for the motors, contacts for controlling the resistances, and means energized by the current through one of the motors to lock the contacts open when the current through said motor is above a predetermined value and to close the contacts when the current is reduced.

17. In a control system a controlled circuit, a series of switches therefor arranged to close in a predetermined order, windings for the switches energized by the current in the controlled circuit, and connections whereby each switch in closing energizes the winding of the next switch to operate and causes the switch which preceded in operation to open.

18. In a control system, a controlled circuit, a series of switches therefor arranged to close in a predetermined order, windings for the switches connected in the controlled circuit by the switch which preceded it in operation, holding windings for the switches, and connections whereby each switch in closing deënergizes the holding means of the preceding switch, maintains itself closed, and energizes the winding of the next switch to operate.

Signed at Cleveland, Ohio, this 26th day of October, 1911.

JAY H. HALL.

Witnesses:
R. H. BENNETT,
H. M. DIEMER.